Figure 4:
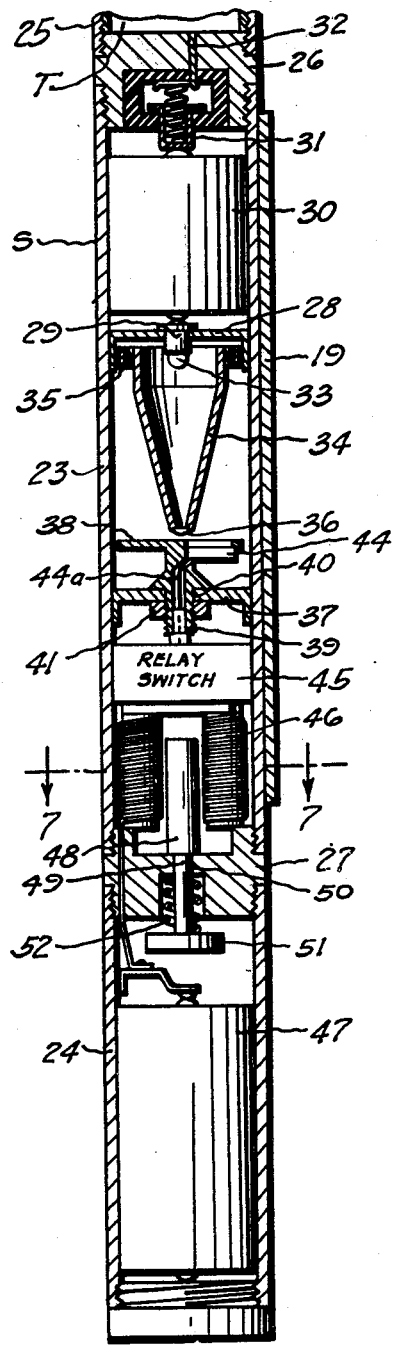

March 23, 1948.  H. G. LIVINGSTON  2,438,293
MEANS FOR BOTTOM HOLE ORIENTATION
Filed July 12, 1943  3 Sheets-Sheet 1
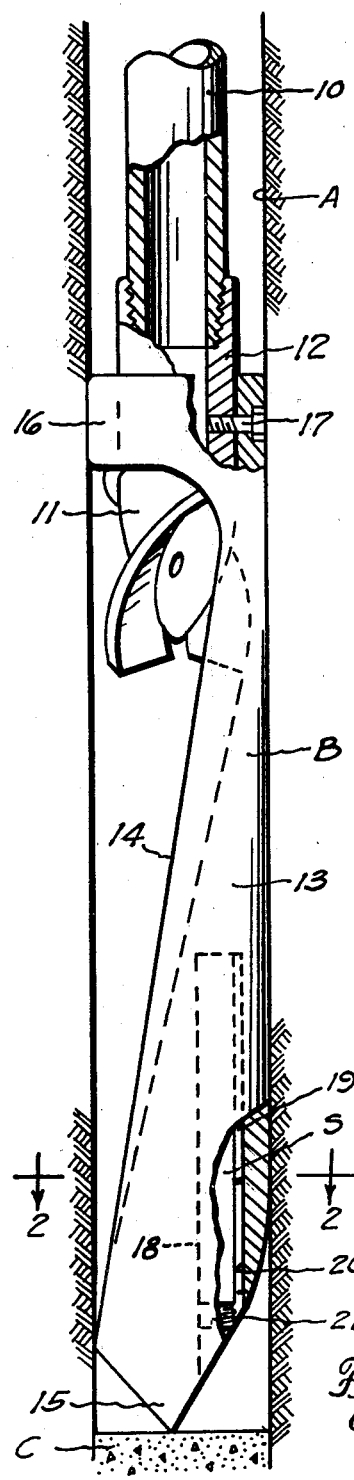
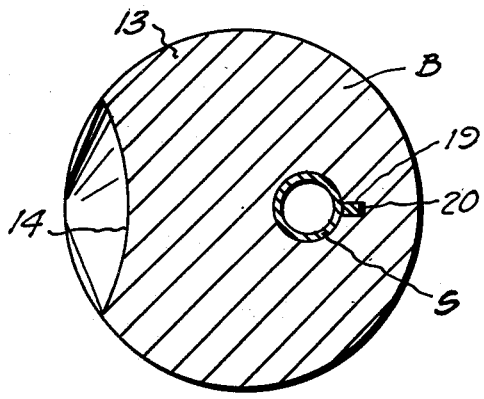
Fig. 2
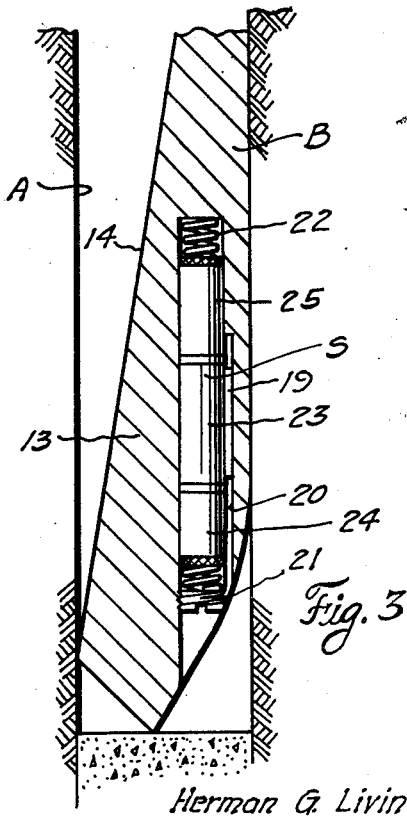
Fig. 3
Fig. 1
Herman G. Livingston
INVENTOR.
BY Joe E. Edwards
ATTORNEY March 23, 1948.  H. G. LIVINGSTON  2,438,293
MEANS FOR BOTTOM HOLE ORIENTATION
Filed July 12, 1943  3 Sheets-Sheet 2

Herman G. Livingston
INVENTOR.
BY Jos E. Edwards
ATTORNEY

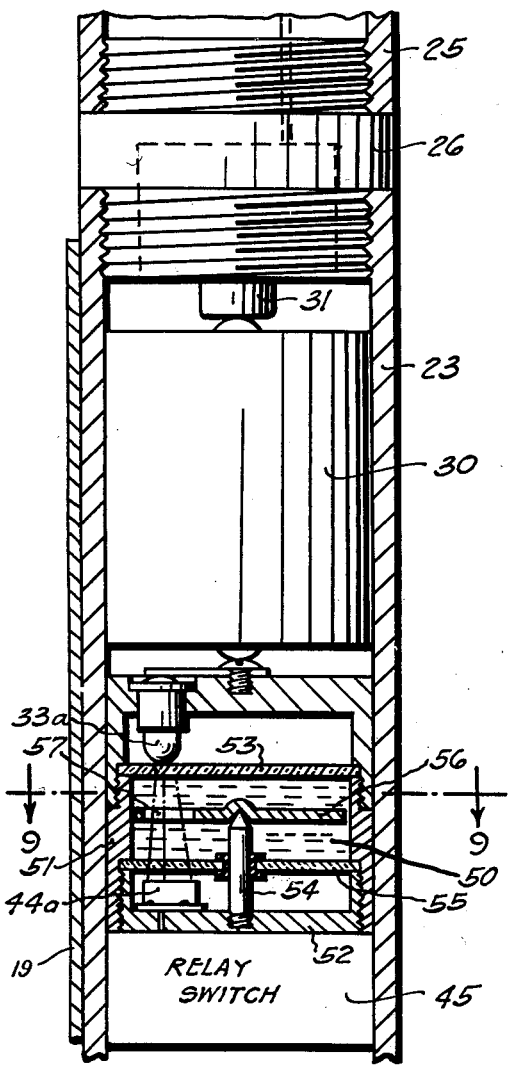
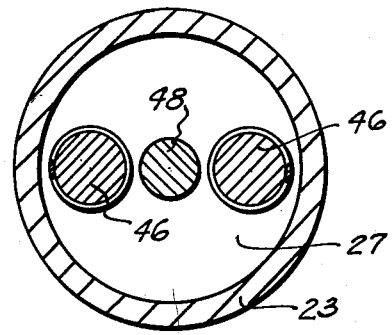
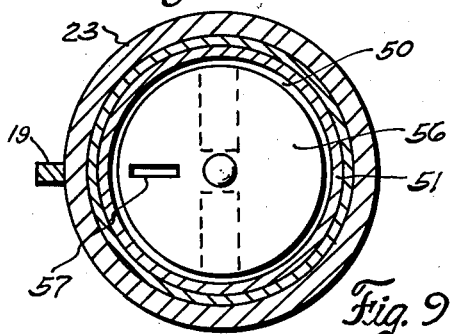

Patented Mar. 23, 1948

2,438,293

UNITED STATES PATENT OFFICE 2,438,293

MEANS FOR BOTTOM HOLE ORIENTATION

Herman G. Livingston, Houston, Tex., assignor, by direct and mesne assignments, to Eastman Oil Well Survey Company, Denver, Colo., a corporation of Delaware Application July 12, 1943, Serial No. 494,315

15 Claims. (Cl. 255—1.6)

This invention relates to new and useful improvements in apparatus for orienting well tools.

One object of the invention is to provide an improved apparatus for orienting a well tool, such as a whipstock, and having means for signalling or transmitting the position of the tool to the surface, whereby the use of wire line or photographic instruments which must be removed from the well bore to obtain the record is eliminated and also whereby orientation of the well tool to the desired position is complete when the signal is transmitted and subsequent orientation of the tool is not necessary.

An important object of the invention is to provide an improved orienting apparatus for a well tool wherein an instrument for indicating and signalling the position of the tool is mounted within the tool itself, whereby the indications made by the instrument are carried out in the same plane or immediately adjacent the tool, thereby assuring accuracy as to the exact position of said tool.

Another object of the invention is to provide an improved orienting apparatus for whipstocks or the like and including an indicating and signalling instrument which is mounted within the whipstock in a fixed position relative to the face of said whipstock; said instrument being lowered and raised with the whipstock and in effect forming a part thereof, whereby the necessity of running and removing the instrument either on a wire line or by means of the drill pipe, is obviated and also whereby the objection to the instrument being in the drill pipe and obstructing circulation of the drilling fluid is eliminated.

Still another object of the invention is to provide an improved orienting apparatus, of the character described, wherein the instrument within the well tool indicates and signals the attainment of a predetermined position by the whipstock, said signal being created by means of a sounding mechanism which generates and transmits sound upwardly along the drill pipe to the surface, whereby the signal may be received at the surface without the use of auxiliary transmission wires or cables.

A further object of the invention is to provide an improved orienting apparatus, of the character described, including an instrument having a slotted indicating medium with a light source on one side of said medium and a light responsive element on the opposite side, whereby when the slot in said medium is alined with the light source, the light responsive element is actuated to generate a signal indicating such alinement; the slotted medium being either a fixed member if the light source is movable or a movable member if the light source is stationary, whereby either a direct or indirect indication may be made.

A still further object of the invention is to provide an improved instrument for an orienting apparatus, of the character described, which is simple and rugged in construction so as to operate efficiently under all conditions, the apparatus also including improved means for setting up and transmitting the signal whereby a timing or similar control mechanism need not be employed.

A construction designed to carry out the invention will be hereinafter described together with other features of the invention.

Figure 5:
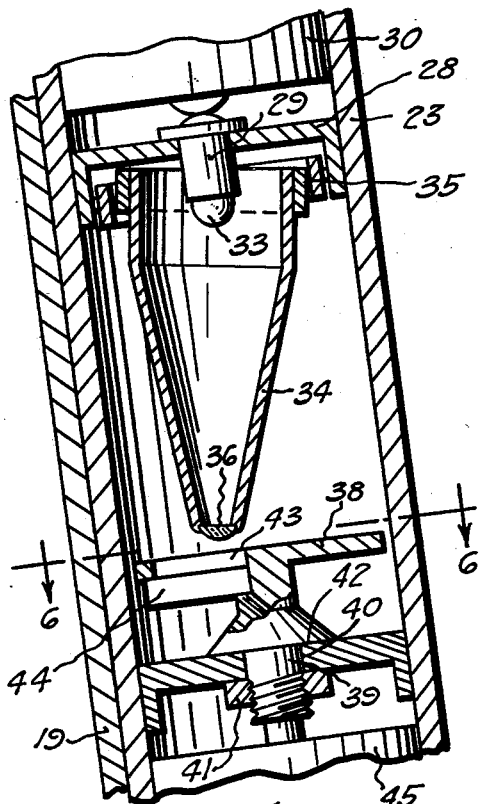
Figure 6:
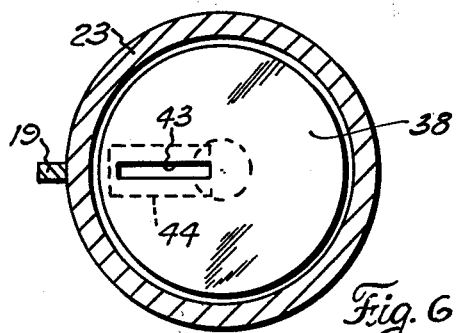

The invention will be more readily understood from a reading of the following specifications and by reference to the accompanying drawings, wherein;

Figure 1 is a view, partly in section and partly in elevation, of an orienting apparatus constructed in accordance with the invention, with the instrument mounted within a whipstock, Figure 2 is an enlarged, horizontal cross-sectional view, taken on the line 2—2 of Figure 1, Figure 3 is a partial longitudinal sectional view of the whipstock showing the instrument mounted therein between shock absorbing springs, Figure 4 is an enlarged, transverse vertical sectional view of the instrument, with said instrument being disposed in a vertical plane, Figure 5 is an enlarged sectional view of the plumb bob unit and showing the casing inclined, Figure 6 is a horizontal, cross-sectional view, taken on the line 6—6 of Figure 5, Figure 7 is an enlarged, horizontal cross-sectional view taken on the line 7—7 of Figure 4, Figure 8 an enlarged, sectional view of a modified form of the invention, wherein a compass is employed, and Figure 9 is a horizontal, cross-sectional view, taken on the line 9—9 of Figure 8.

In the drawings the numeral 10 designates a drill pipe or stem which is adapted to be lowered within the well bore A. A drill bit 11 is carried by the lower end of the drill pipe 10 and has its tubular shank 12 threaded onto the extreme lower end of said pipe. A whipstock B is arranged to be connected with the shank 12 of the drill bit and said whipstock comprises an elongate wedge-shaped body 13 having an elongate inclined face 14 which is generally concave in cross-section. The lower end of the body is pointed as indicated at 15 while a collar 16 is formed integral with the upper end of the whipstock body, said collar encircling the shank 12 and being fastened thereto by means of a shear pin 17.

The whipstock is used in the usual manner and is lowered within the well bore A by means of the drill pipe. The lower pointed end of the whipstock is seated upon a cement or other plug C within the well bore and through rotation of the pipe, the face of said whipstock is directed into a desired position. After the whipstock is set, a downward force is exerted upon the drill pipe to impose the weight thereof upon the shear pin 17 with the result that said pin is sheared to permit the drill bit and pipe to move downwardly with respect to the whipstock. The inclined face 14 will of course guide the bit 11 into the formation at an angle with relation to the axis of the well bore A. After drilling is complete the whipstock may be retrieved because the bit 11 is larger than the collar 16 and an upward movement of the pipe and bit will result in raising the whipstock therewith. It is pointed out that the particular whipstock and its connection with the drill pipe form no part of the present invention and these elements may be of any desired construction.

In carrying out the present invention, the body 13 of the whipstock B is formed with a longitudinal bore or opening 18 which extends upwardly from the lower end of said whipstock at the rear or trailing side of the whipstock. A well survey instrument S which will be hereinafter described in detail is insertable within the bore 18. The instrument is nonrotatably maintained within the bore in a predetermined position by means of an elongate key or rib 19 which engages within a groove or keyway 20 formed in the body. The key 19 is formed integral or secured to the outer surface of the casing of the instrument S and extends radially therefrom, and the keyway is in a predetermined or known position with respect to the face 14 of said whipstock, whereby when the instrument is within the bore 18, the position of the key or rib with relation to the whipstock face 14 is known. The extreme lower end of the bore 18 is internally screw threaded to receive a closure or plug 21 which retains the instrument within the bore of the whipstock.

Because of the fact that the whipstock may be subjected to considerable shock and jar not only during lowering and raising of the whipstock with the bore A but also during the actual drilling operation, it may be desirable to mount the instrument as shown in Figure 3. In such instance, shock absorbing springs 22 are disposed at each end of the instrument, the upper spring being confined between the instrument and the end of the bore 18 with the lower spring being confined between the closure or plug 21. With such arrangement the instrument is resiliently supported within the bore and the springs 22 absorb any shock and vibration so as to protect said instrument from damage as a result thereof.

The details of the instrument S are clearly shown in Figures 4 to 6, said instrument including a tubular casing which is constructed of a central or intermediate section 23, a lower section 24 and an upper section 25. A coupling 26 connects the sections 23 and 25 while a similar coupling 27 connects the sections 23 and 24. The central section 23 of the housing has a partition 28 secured within its upper portion and a lamp socket 29 is supported axially within this partition. A battery 30 having electrical connection with the socket is disposed above the partition and the upper contact of the battery is engaged by a resilient contact member 31 which is mounted in the upper coupling 26. A lead wire 32 connects the member 31 with a timing mechanism T, whereby said mechanism is in the battery circuit. Only the lower end of the timing mechanism T is illustrated in Figure 4, said mechanism being of the usual construction and being mounted within the upper section 25 of the instrument casing. A lamp or light source 33 is mounted within the socket 29 and when the timing mechanism T closes the circuit, the battery circuit to the lamp socket is complete and the lamp 33 is illuminated. It is pointed out that the use of a timing mechanism is optional and as will be hereinafter explained, such mechanism may be entirely omitted.

For controlling the projection of light rays from the lamp 33, a tubular plumb bob 34 is mounted within the section 23 and has its upper end encircling the lamp 33. The plumb bob is conical in shape and has its upper end mounted in the usual gimbal rings 35 with a suitable lens 36 secured within its lower reduced end.

A second partition or support 37 extends across the interior of the section 23 and a stationary disk 38 is mounted above this support. The disk is provided with a downwardly extending shank 39 which projects through a circular opening 40 in the support and a nut 41 which threads onto the shank serves to clamp an external shoulder 42 on said shank against the upper end of the support. In this manner the disk 38 is nonrotatably mounted within the instrument and is located with its upper surface adjacent the lower reduced end of the plumb bob 34. The disk 38 is provided with a radially extending slot or opening 43 (Figure 6) and this slot is positioned in a known or predetermined relationship to the key 19 so that when in position within the bore 18 it bears a known relationship to the whipstock face. Immediately below the slot 43 a photoelectric cell 44 or other light responsive element is secured to the under side of said disk. The photo-electric cell is electrically connected through a wire 44a with a relay switch 45, said switch being mounted within the section 23 below the support 37.

The relay switch is in turn electrically connected with an electro-magnet 46 which forms part of a sounding mechanism. The coils of the electro-magnet are supplied with current from a battery 47 which is housed within the lower section 24. The core 48 of the magnet 46 has a reduced rod 49 preferably formed integral therewith and this rod is slidable through an axial opening 50 which is formed in the coupling 27. A hammer 51 which is in the form of a disk is secured to the lower end of the rod and said hammer is disposed below the coupling 27 being normally held away from the under side thereof by a coil spring 52. When the electro-magnet is operated, the hammer 51 is rapidly reciprocated to strike the under side of the coupling 27 and thereby generate a vibrating sound. This sound is transmitted upwardly through the whipstock B and through the drill pipe 10 to the surface, where it may be picked up by holding a stethoscope or microphone connected to a suitable amplifier against the outer surface of said drill pipe.

In the operation of the apparatus, a preliminary survey of the well bore is made at the point at which the whipstock is to be set to determine the direction of inclination of said bore at such elevation. For the purposes of this description it will be assumed that such direction of inclination is "north" and also it will be assumed that drilling is to continue in said direction which means that it is desired to locate the face 14 of the whipstock toward "north." The instrument S is inserted within the longitudinal bore 18 of the whipstock and as explained is non-rotatably mounted therein by means of the key 19 and slot 20. The key on the exterior surface of the instrument case bears a known relationship to the slot 43 in the stationary disk 38 and as illustrated, said key is in radial alinement with said slot. Since the key 19 is 180 degrees opposite the whipstock this locates the slot 20 which co-acts with said key 180 degrees opposite the face 14 of the whipstock. Thus when the instrument is within the bore 18 the radial slot 43 in the stationary disk 38 is exactly 180 degrees opposite the inclined guide face 14 of the whipstock.

The whipstock is attached to the drill pipe in the manner shown in Figure 1, or in any other desired way, and is then lowered into the well bore until the lower pointed end of the whipstock strikes the plug or obstruction C which determines the point at which the angular drilling is to begin. At this time the lamp 33 is not illuminated because the timing mechanism has been previously set to permit sufficient time for lowering of the whipstock to the proper position.

After the time for which the mechanism T has been set has elapsed the lamp 33 is automatically illuminated and when this occurs the operator at the surface slowly rotates the drill pipe 10. Since the well bore has some inclination, the plumb bob will of course swing with its lower end toward the low side of the well bore and the parts will be in substantially the position shown in Figure 5, with the light rays being directed in a radial plane alined with the low side of said bore. As the drill pipe is rotated a rotation is imparted to the whipstock and to the instrument which is nonrotatably mounted therein and since the disk 38 is fixed or stationary within the instrument, it will also be rotated. The plumb bob being mounted on gimbals will always remain at the low side of the hole and therefore the rotation of the whipstock and instrument will result in a rotation of the disk 38 with respect to the lower reduced end of the plumb bob from which the light rays are emitted. As soon as the slot 43 in the disk 38 moves into alinement with the lower end of the plumb bob, the light rays will pass through the slot and strike the photo-electric cell 44. Since it is known that the lower end of the plumb bob indicates the low side of the well bore, it is known that the light rays can strike the photo-electric cell only when the slot 43 is also at the low side of the hole. As soon as the photo-electric cell receives light, the relay switch is actuated to alternately energize the electromagnet and reciprocate the hammer 51. As explained, the reciprocation of the hammer will create a sound which will travel upwardly through the drill pipe 10 to the surface. The slot 43 in the disk 38 is opposite the low side of the hole and knowing that said slot is 180 degrees opposite the face of the whipstock, the operator is advised that the face is directed toward the high side of the hole.

Since the preliminary survey prior to the whipstocking operation has advised the operator that well bore A is inclining toward north, it is obvious that when the signal is sounded, the slot 43 is opposite or directed south. By considering the angular relation between the slot 43 and whipstock face 14, which in this instance, is 180 degrees, the exact position of the face is known. In the example herein assumed, the face is directed north which is the direction in which drilling is to continue and therefore, after the signal is given it is only necessary to shear the pin 17 and detach the drill pipe from the whipstock, whereby subsequent angular drilling may be carried out. It is noted that the timing mechanism may be set to break the circuit to the lamp 33 after a predetermined time sufficient to receive the signal so that during subsequent drilling operations, the instrument S is not actuated. However, the timing mechanism may be entirely omitted for obviously the circuit to the sounding mechanism cannot be completed until the light strikes the photo-electric cell and therefore the device would not operate until orientation has been completed. Of course when no timing mechanism is employed, the signal would continue to sound but this would make no difference so far as results are concerned. After drilling is complete the whipstock is withdrawn from the well with the drill pipe and since the instrument is mounted within the said whipstock, the instrument is recovered therewith.

From the foregoing, it will be seen that the instrument is mounted directly within the body of the whipstock and this means that the inclination and the signal given by said instrument is carried out in the same plane as the whipstock. In other words, the instrument is opposite the lower end of the inclined face 14 and a very accurate indication may be made. In previous orienting apparatuses the instrument has been mounted within the drill pipe or drill stem at a point above the whipstock itself with the result that the possibility of error has been increased. Not only does the instrument provide a very accurate indication but also it is entirely removed from the drill pipe and forms no obstruction to the circulation of the drilling fluid through said pipe. Also by mounting the instrument within the whipstock itself, said instrument is raised and lowered therewith and the use of auxiliary lines or cables for lowering and raising the instrument is entirely eliminated.

As explained, the slot 43 in the disk is 180 degrees opposite the whipstock face so that when said slot is at the low side (south) of the hole, the face is properly directed north. Manifestly, if it was desired to drill east or west or some other direction, the slot 43 could be adjusted with respect to the key 19 and to the whipstock face so that upon the signal when the slot is disposed south, the whipstock face will be in a predetermined desired direction.

Although the particular instrument which has been described and which is shown in Figures 4 to 6 has been found particularly adaptable for use in a whipstock it is pointed out that another type of instrument having means for signalling the position of the whipstock to the surface may be employed. In other words, the invention is not to be limited to the particular details of construction of the instrument S and any instrument capable of signalling to the surface may be used.

The instrument shown in Figures 4 to 6 provides an indirect method of indicating the position of the whipstock face because it utilizes a plumb bob which indicates the low side of the well bore. With this type of indirect indication, it is necessary that a preliminary survey be made unless subsequent angular drilling is to be performed either in the direction of the low side or the high side of the well bore. In order to obtain a direct reading, the instrument shown in Figures 7 to 10 may be employed. This instrument is substantially identical in construction with the instrument hereinbefore described, the only change being in the plumb bob unit. A lamp 33a is mounted at one side rather than centrally of the partition 28 and a compass unit 50 is disposed below said lamp. The compass unit includes a housing 51 which has its lower end closed by a bottom 52, while its top is closed by a glass plate or window 53. As is clearly shown in Figure 8, the window 53 is immediately below the lamp 33a so as to permit the light rays to enter the interior of the compass unit. The bottom 52 of the unit rests upon the relay switch 45 and has an upstanding pin 54 mounted axially therein. The pin extends through a glass partition 55 which extends across the interior of the unit and a compass disk 56 is supported upon the upper end of the pin. The compass disk is confined between the two glass members 53 and 55 and a suitable dampening fluid may be contained in this compass chamber.

The compass disk 56 has a radial slot 57 therein and this slot indicates a fixed point of the compass, for instance, north. When the slot 57 is alined with the lamp 33a the light rays will pass downwardly through the slot and onto a photo-electric cell 44a which cell is mounted on the bottom 52 of the compass unit. The cell 44a is of course electrically connected with the relay switch and said switch controls the operation of the sounding mechanism hereinbefore described.

The operation of this form of the invention is obvious. The instrument is mounted within a whipstock made of nonmagnetic material or at least having that portion surrounding the instrument of nonmagnetic material. The compass 56 will seek true magnetic north with the result that the slot 57 will always be disposed in a predetermined direction which will be presumed to be north. When the whipstock has been lowered into the well bore and sufficient time has elapsed for the mechanism to illuminate the lamp 33a the drill pipe and whipstock as well as the instrument are slowly rotated. The lamp 33a and the photo-electric cell 44a are in vertical alinement and the compass disk 56 forms a shutter which normally prevents the passage of the light rays from one to the other. As the instrument is rotated, the slot 57 in the compass disk remains stationary pointing at true north while the light source 33a and photo-electric cell 44a are rotated with respect to said disk. As soon as the lamp and photo-electric cell move into alinement with the slot 57, the light rays strike the photo-electric cell to set the sounding mechanism into operation. The key 19 on the exterior surface of the instrument casing will in this instance be in a known relationship to the light source and photo-electric cell and as illustrated is alined therewith. Thus since the key is 180 degrees opposite the face of the whipstock, it will be known that when the signal is sounded the slot is opposite north which means that the face of the whipstock is directed south. By disposing the slot 57 in the compass disk in a predetermined angular position with relation to the north point, it is manifest that a signal will be given when the whipstock face reaches a predetermined desired position.

It is apparent that the form shown in Figures 7 to 10 has all of the advantages as the first form of instrument and in addition eliminates the necessity of making a preliminary survey. In other words, a direct azimuthal indication is given so that the exact direction of the whipstock face is indicated. In both instances, the instrument is mounted within a bore formed in the whipstock itself with the result that the indications are in the same plane as the whipstock face and are therefore extremely accurate. It is pointed out that any suitable sounding mechanism may be employed for generating a sound for transmission to the surface and the invention is not to be limited to the particular hammering arrangement shown and described. So long as the sounding mechanism is actuated by the photo-electric cell when the latter receives the light beam, the purposes of the invention will be accomplished.

What I claim and desire to secure by Letters Patent is:

1. The combination with a whipstock having a main body portion and adapted to be attached to and lowered with a drill pipe into a well bore, of a well survey instrument mounted completely within the main body portion of said whipstock for indicating the azimuthal position of said whipstock within the bore.

2. The combination with a whipstock adapted to be attached to a drill pipe and lowered therewith into a well bore, of a well survey instrument mounted within the body of the whipstock and disposed in a non-rotatable predetermined position with respect to the face of said whipstock.

3. The combination with a whipstock having an inclined guide face and having a longitudinal opening therein, of a well survey instrument mounted within said opening, and means for securing said instrument within said opening in a non-rotatable predetermined position with respect to the whipstock face.

4. The combination as set forth in claim 2, wherein the instrument includes a light source, a stationary light responsive element which bears a predetermined position with relation to the whipstock face, means actuated by the reception of light by the element for generating a signal, and means indicative of direction for controlling the passage of light from said light source to said light responsive element.

5. The combination as set forth in claim 2, wherein the instrument includes a light source, a stationary light responsive element which is maintained in a predetermined position with respect to the whipstock face, means actuated by the reception of light by the light responsive element for generating a signal, and a tubular plumb bob through which the light rays from the source are directed whereby said light rays strike the light responsive element only when said element is at the low side of the well bore.

6. The combination as set forth in claim 2, wherein the instrument includes a light source, a stationary light responsive element which is maintained in a predetermined position with relation to the whipstock face, means actuated by the reception of light by the light responsive element for generating a signal, and a compass having a radial slot therein and interposed between the light source and light responsive element, whereby said compass intercepts the light rays and permits passage thereof to the light responsive element only when said element is alined with the slot in said compass to signal the position of said element.

7. The combination with a whipstock comprising an elongate wedge-shaped body whereby an inclined guide face is formed, said body having a longitudinal bore with its lower end open, of a well survey instrument insertable within said bore, co-acting means on said instrument and within the bore of the body for non-rotatably maintaining the instrument in a predetermined position with respect to the inclined face of the whipstock, and a removable closure for retaining the instrument therein.

8. The combination as set forth in claim 7, together with shock absorbing springs confined within the bore at each end of the instrument for absorbing excessive shock and vibration.

9. An apparatus for orienting a whipstock including, in combination, a drill pipe, a whipstock secured to the lower end of said pipe, said whipstock having a main body portion formed with an inclined guide face and also having a longitudinal bore with said main body portion, a well survey instrument mounted within the bore of said whipstock and having means for indicating and signalling the azimuthal position of the face of said whipstock to the surface.

10. An apparatus for orienting a whipstock including, in combination, a drill pipe, a whipstock secured to the lower end of said pipe, said whipstock having a main body portion formed with an exterior inclined guide face and also having a longitudinally extending bore with said body portion, a well survey instrument mounted within the bore and including a sounding mechanism for signalling the azimuthal position of the whipstock to the surface.

11. An apparatus as set forth in claim 10, wherein the instrument also includes, a light source, a light responsive element which actuates the sounding mechanism when receiving light from said light source, and direction indicating means for controlling the passage of light from said source to said light responsive element.

12. An apparatus as set forth in claim 10, wherein the instrument also includes, a light source, a stationary light responsive element for actuating the sounding mechanism upon the reception of light from said light source, a tubular plumb bob for controlling the light rays passing from the source to said element, whereby said element receives light only when in a position at the low side of the well bore, and means for non-rotatably mounting the instrument within the whipstock, whereby the light responsive element is maintained in a predetermined position with relation to the face of the whipstock.

13. An apparatus as set forth in claim 10, wherein the instrument includes, a light source, a stationary light responsive element for actuating the sounding mechanism when light is directed onto the element, a compass having a radial slot therein and interposed between the light source and light responsive element for controlling the passage of light to said element, and means for non-rotatably mounting the instrument within the whipstock, whereby the light responsive element is maintained in a predetermined position with relation to the face of the whipstock.

14. A whipstock forming part of an orienting apparatus and including an elongate body having an inclined guide face extending longitudinally thereof whereby the lower portion thereof is larger in cross section than the upper portion, said body having a longitudinally extending bore within said enlarged portion for receiving an orienting instrument, an orienting instrument mounted within the opening, and means for non-rotatably mounting said instrument in a known position with respect to the inclined guide face of said whipstock, said instrument having means for generating and transmitting a signal when the whipstock face attains a predetermined azimuthal position.

15. A whipstock for deflecting a well tool and comprising an elongate wedge shaped body, said body having a longitudinally extending bore in its rear or trailing side, which bore has an open lower end, and a closure for closing said open lower end of the bore, an orienting instrument insertable within said bore, and means for non-rotatably mounting said instrument in a predetermined known position with respect to the inclined face of said whipstock.

HERMAN G. LIVINGSTON.

REFERENCES CITED

The following references are of record in the file of this patent:

UNITED STATES PATENTS

| Number | Name | Date |
|---|---|---|
| 1,380,954 | Hall et al. | June 7, 1921 |
| 2,012,138 | Palmer et al. | Aug. 20, 1935 |
| 2,108,419 | Trotter | Feb. 15, 1938 |
| 2,109,853 | Straatman | Mar. 1, 1938 |
| 2,136,748 | Lottinger | Nov. 15, 1938 |
| 2,190,950 | Potapenko | Feb. 20, 1940 |
| 2,196,517 | Bolton | Apr. 9, 1940 |
| 2,197,227 | Strength | Apr. 16, 1940 |
| 2,246,417 | Smith | June 17, 1941 |
| 2,255,295 | Miller | Sept. 9, 1941 |
| 2,255,721 | Mattingly | Sept. 9, 1941 |
| 2,268,256 | Knouse | Dec. 30, 1941 |
| 2,282,431 | Smith | May 12, 1942 |
| 2,303,360 | Irwin | Dec. 1, 1942 |
| 2,317,632 | Miller | Apr. 27, 1943 |
| 2,345,766 | Miller | Apr. 4, 1944 |